(12) United States Patent
Wakao et al.

(10) Patent No.: US 12,054,012 B2
(45) Date of Patent: Aug. 6, 2024

(54) NON-PNEUMATIC TIRE, MOBILE POWER SUPPLY DEVICE AND MOBILE

(71) Applicant: BRIDGESTONE CORPORATION, Tokyo (JP)

(72) Inventors: Yasumichi Wakao, Tokyo (JP); Masashi Nishida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 385 days.

(21) Appl. No.: 17/616,143

(22) PCT Filed: Jun. 10, 2020

(86) PCT No.: PCT/JP2020/022765
§ 371 (c)(1),
(2) Date: Dec. 2, 2021

(87) PCT Pub. No.: WO2020/250912
PCT Pub. Date: Dec. 17, 2020

(65) Prior Publication Data
US 2022/0250419 A1    Aug. 11, 2022

(30) Foreign Application Priority Data
Jun. 12, 2019    (JP) ................................ 2019-109492

(51) Int. Cl.
*B60C 19/00* (2006.01)
*B60C 7/14* (2006.01)
(Continued)

(52) U.S. Cl.
CPC .............. *B60C 19/00* (2013.01); *B60C 7/146* (2021.08); *H02J 50/05* (2016.02); *B60B 9/04* (2013.01)

(58) Field of Classification Search
CPC ....... B60C 19/00; B60C 19/08; B60C 19/082; B60C 7/146; B60C 7/22; H02J 50/005; H02J 50/05
See application file for complete search history.

(56) References Cited

U.S. PATENT DOCUMENTS 1,797,545 A * 3/1931 Churcher ................ B60C 19/08
310/90
2005/0110277 A1   5/2005 Adamson et al.
(Continued)

FOREIGN PATENT DOCUMENTS

| CN | 1799894 A | 7/2006 |
|---|---|---|
| CN | 103640484 A | 3/2014 |

(Continued)

OTHER PUBLICATIONS

Aug. 8, 2020 Search Report issued in International Patent Application No. PCT/JP2020/022765.
(Continued)

*Primary Examiner* — Kip T Kotter
(74) *Attorney, Agent, or Firm* — Oliff PLC (57) ABSTRACT

A non-pneumatic tire has an inner annular body centered on a rotation axis portion, an outer annular body provided radially outward of the inner annular body, a wheel portion including a connecting member elastically deforming and for connecting the inner annular body and the outer annular body, and a tread portion provided radially outward of the outer annular body and in contact with a road. The non-pneumatic tire is provided with an electrode portion which is in contact with the tread portion and is provided on the radially inner side of tread portion, and a wiring portion which connects the electrode portion and the inner annular body and is formed of a conductor. A part of the wheel portion is formed of a nonmetallic material, and the elec-
(Continued)

trode portion is formed of a conductor having a prescribed width in tire width direction and a prescribed length in tire circumferential direction.

11 Claims, 8 Drawing Sheets

(51) Int. Cl.
   *H02J 50/05* (2016.01)
   *B60B 9/04* (2006.01)

(56) References Cited

U.S. PATENT DOCUMENTS

| | | |
|---|---|---|
| 2014/0360256 A1 | 12/2014 | Orlewski |
| 2015/0266385 A1* | 9/2015 | Lang ................. B60L 53/12 320/108 |
| 2017/0096031 A1 | 4/2017 | Omata |
| 2018/0001699 A1 | 1/2018 | Shoji |
| 2018/0326801 A1 | 11/2018 | So et al. |
| 2018/0333984 A1* | 11/2018 | Wilson ................. B60C 7/18 |
| 2019/0030964 A1 | 1/2019 | Narowski |
| 2019/0123587 A1 | 4/2019 | Titov et al. |
| 2019/0283495 A1 | 9/2019 | Nishida et al. |
| 2020/0198413 A1* | 6/2020 | Bohn ................. B60C 7/18 |
| 2021/0138911 A1 | 5/2021 | Mizutani et al. |

FOREIGN PATENT DOCUMENTS

| | | |
|---|---|---|
| CN | 206353716 U | 7/2017 |
| CN | 107206841 A | 9/2017 |
| CN | 207059809 U | 3/2018 |
| DE | 26 10 621 A1 | 9/1977 |
| DE | 102015206472 A1 * | 10/2016 |
| GB | 769801 A | 3/1957 |
| IN | 108859620 A | 11/2018 |
| JP | S51-87202 A | 7/1976 |
| JP | 5777139 B2 | 9/2015 |
| JP | 2016-502383 A | 1/2016 |
| JP | 2017-043150 A | 3/2017 |
| JP | 2018-083456 A | 5/2018 |
| KR | 10-2012-0015647 A | 2/2012 |
| WO | 2016/031832 A1 | 3/2016 |
| WO | 2019/008966 A1 | 1/2019 |

OTHER PUBLICATIONS

Feb. 15, 2023 Search Report issued in Chinese Patent Application No. 202080040987.3.

* cited by examiner

NON-PNEUMATIC TIRE, MOBILE POWER SUPPLY DEVICE AND MOBILE

TECHNICAL FIELD

The present invention relates to a non-pneumatic tire, a mobile power supply device and a mobile that can be suitably used in a non-contact power supply system.

BACKGROUND ART

As a method of supplying electric power to vehicles such as electric vehicles by non-contact (wireless) (non-contact power supply method), a so-called electric field power supply method is known (see PTL 1).

In the electric-field power supply system, a tire fitted to a rim wheel relays the electric field from the metal plate embedded in the road into the vehicle. As a result, power supply from the roadside to the vehicle can be performed, and the vehicle can also be operated while traveling.

In recent years, a non-pneumatic tire having a structure different from that of a pneumatic tire for filling air in an internal space of the pneumatic tire fitted to a rim wheel is known (see PTL 2). Specifically, the non-pneumatic tire includes an inner annular body (also referred to as an inner cylinder) centered on a rotation axis portion, an outer annular body (also referred to as an outer cylinder) provided radially outward of the inner annular body, a connecting member elastically deforming and for connecting the inner annular body and the outer annular body, and a tread portion provided radially outward of the outer annular body and in contact with a road.

CITATION LIST

Patent Literature

[PTL 1] Japanese Patent No. 5777139
[PTL 2] Japanese Patent Laid-Open No. 2018-083456

SUMMARY OF INVENTION

When the electric power is supplied to the vehicle equipped with the non-pneumatic tire as described above by the electric field power supply method, the following problems occur.

Specifically, since the connecting member and the outer annular body constituting the non-pneumatic tire are formed of a resin material, that is, a non-metallic material, the conductivity is lower and the transmission efficiency of power is lower than that of the metal rim wheel.

Accordingly, an object of the present invention is to provide a non-pneumatic tire, a mobile power supply device and a mobile capable of improving the transmission efficiency of power supplied from the road side even when main components are formed of a non-metallic material.

One aspect of the present invention is a non-pneumatic tire (for example, non-pneumatic tire 10) including a wheel portion (wheel portion 30) including an inner annular body (inner annular body 40) centered on a rotation axis portion (rotation axis portion 41), an outer annular body (outer annular body 50) provided radially outward of the inner annular body, and a connecting member (connecting member 60) elastically deforming and for connecting the inner annular body and the outer annular body, and a tread portion (tread portion 20) provided radially outward of the outer annular body and in contact with the road (road 200). The non-pneumatic tire includes an electrode portion (electrode portion 70) provided inside the tread portion, or in contact with the tread portion, and radially inside the tread portion, and a wiring portion (wiring portion 80) for connecting the electrode portion and the inner annular body and formed of a conductor. At least a part of the wheel portion is formed of a non-metallic material, and the electrode portion is formed of a conductor having a predetermined width in tire width direction, and having a predetermined length in tire circumferential direction.

BRIEF DESCRIPTION OF DRAWINGS

FIGS. 8 A and 8 B are partial front views and partial sectional views of a non-pneumatic tire 10 D of a modified example 4.

DESCRIPTION OF EMBODIMENTS

Embodiments will be described below with reference to the drawings. Note that the same functions and structures are denoted by the same or similar reference numerals, and the description thereof is omitted as appropriate.

(1) Overall Schematic Configuration of the Power Supply System

Figure 1:
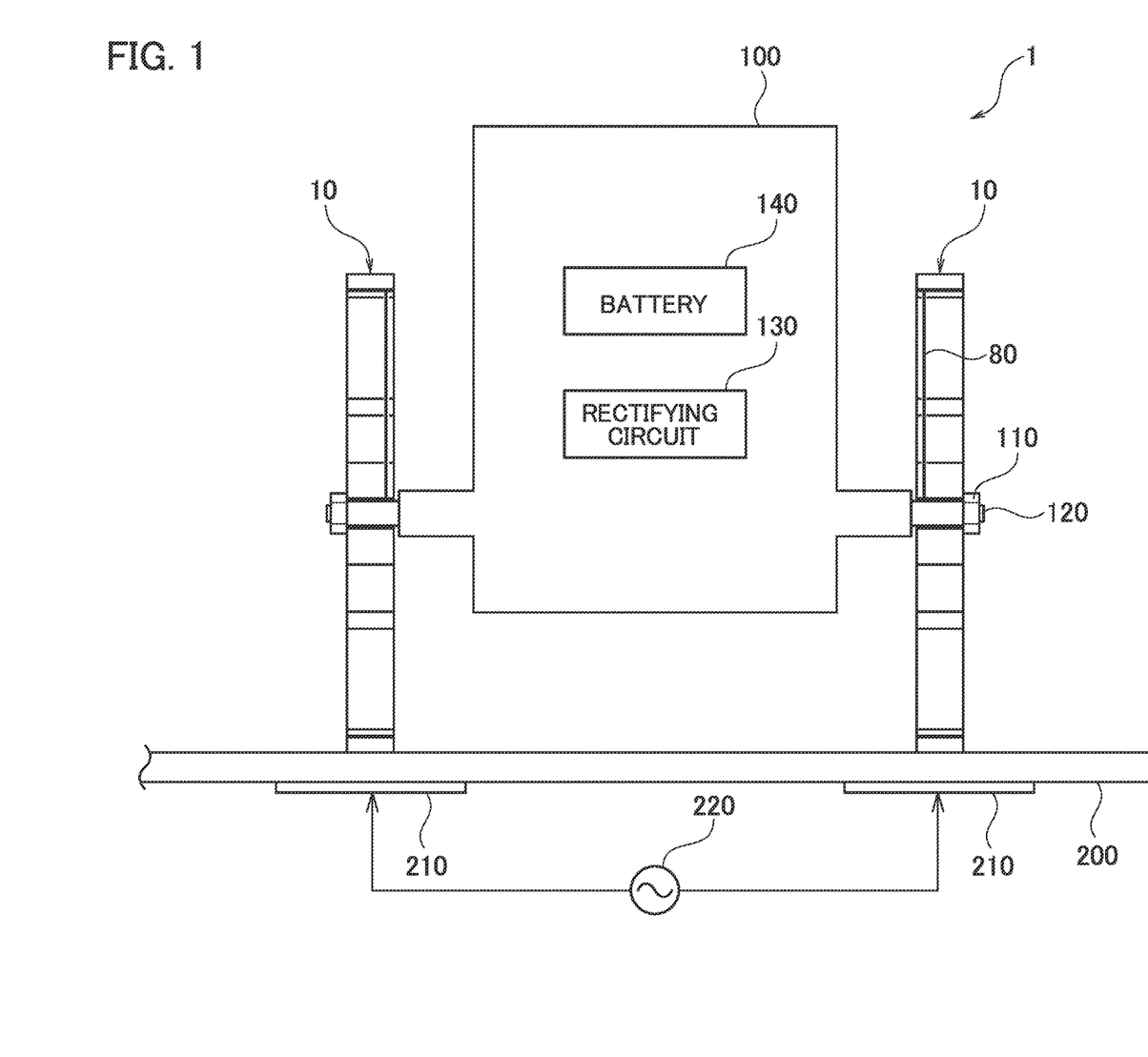
FIG. 1 is an overall schematic diagram of a power supply system 1.

FIG. 1 is an overall schematic configuration diagram of the power supply system 1 according to the present embodiment. As shown in FIG. 1, the power supply system 1 includes a wheeled mobile 100 and a road 200. The non-pneumatic tire 10 is mounted on the wheeled mobile 100.

Specifically, FIG. 1 shows a schematic cross-sectional view of the wheeled mobile 100 (including the non-pneumatic tire 10) along the width direction and a schematic cross-sectional view of the road 200 along the width direction.

The wheeled mobile 100 is a mobile moving on a road, and in the present embodiment, it is an electric wheelchair to which two non-pneumatic tire 10 are mounted. In addition to the non-pneumatic tire 10, an auxiliary tire (not shown) for changing the direction may be mounted to the wheeled mobile 100.

The wheeled mobile 100 is not limited to an electric wheelchair to which two non-pneumatic tire 10 s are mounted, and may be a handle-type electric wheelchair to which four non-pneumatic tire 10 s are mounted, i.e., a so-called senior-car (Registered trademark). In this case, the diameter size of the non-pneumatic tire 10 may be smaller than the diameter size shown in FIG. 1.

A pair of power transmission units 210 are embedded in the road 200 through which the wheeled mobile 100 passes. The pair of power transmission units 210 are embedded with a predetermined distance therebetween in the width direction of the road 200 (the direction orthogonal to the moving direction of the wheeled mobile 100) so as to correspond to the tread width (the width between the right and left tire) of the wheeled mobile 100. The road 200 is typically a road through which a vehicle passes or a pedestrian passage, but is not limited to a road or a passage as long as the transmission unit 210 can be installed in a place such as a floor of a building.

A power supply device 220 is connected to the pair of power transmission units 210. The power supply device 220 supplies electric power to the wheeled mobile 100 through the power transmission unit 210. Specifically, the power supply device 220 realizes a system (non-contact power supply system) in which power is supplied by non-contact (wireless) through the power transmission unit 210.

Such a non-contact power supply system is called an electric field power supply system. In the electric field power supply system, a series resonance circuit is formed on both the power transmission side (the road 200 side) and the power reception side (the wheeled mobile 100 side), and power (AC power) is transmitted in a resonance state. In this embodiment, the resonance frequency is about 100 kHz to 13 MHz.

The non-pneumatic tire 10 is rotatably mounted to an axle 120 of the wheeled mobile 100 using a nut 110. The axle 120 is made of metal, and as will be described later, the non-pneumatic tire 10 mounted on the axle 120 is electrically connected to the axle 120.

AC power is supplied from the power supply device 220 to a rectifying circuit 130 provided in the wheeled mobile 100 via the power transmission unit 210, the road 200, the non-pneumatic tire 10 and the axle 120. The rectifying circuit 130 supplies rectified DC power to a battery 140.

The battery 140 supplies power to a moving motor (not shown) of the wheeled mobile 100. On the other hand, the battery 140 stores power supplied from the outside. The external power supply includes the power supply device 220 on the road 200 and a power supply connected to a charging socket (not shown). Since the power supply from the power supply device 220 to the battery 140 is non-contact (wireless) as described above, the battery can be charged even during the movement of the wheeled mobile 100.

In this embodiment, the power transmission unit 210 and the power supply device 220 on the road 200 side constitute the mobile power supply device for supplying power to the wheeled mobile 100 moving on the road 200. The wheeled mobile 100 constitutes a mobile fed from the mobile feeding device.

(2) Configuration of Non-Pneumatic Tire

Figure 2:
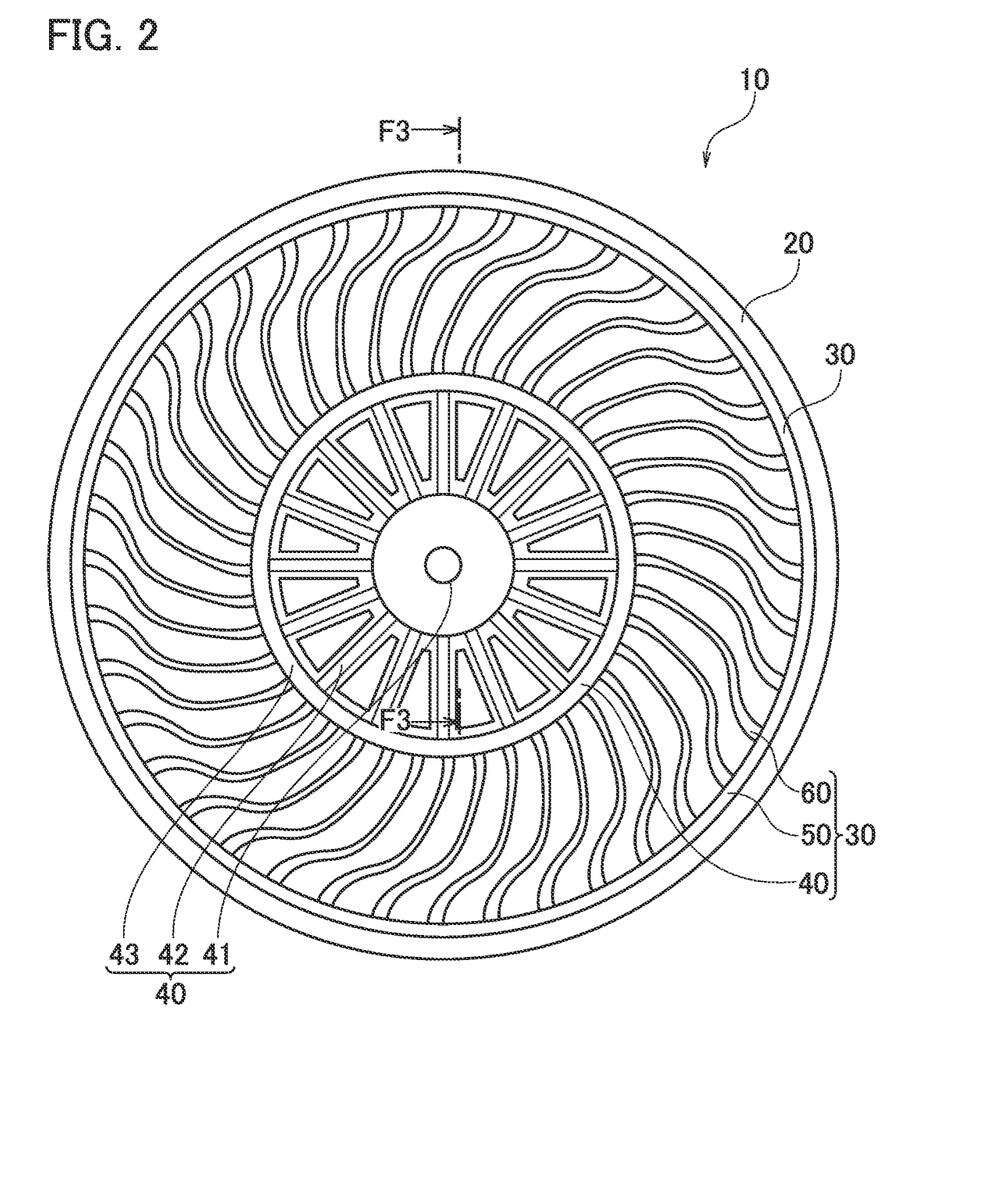
FIG. 2 is an overall side view of a non-pneumatic tire 10.
Figure 3:
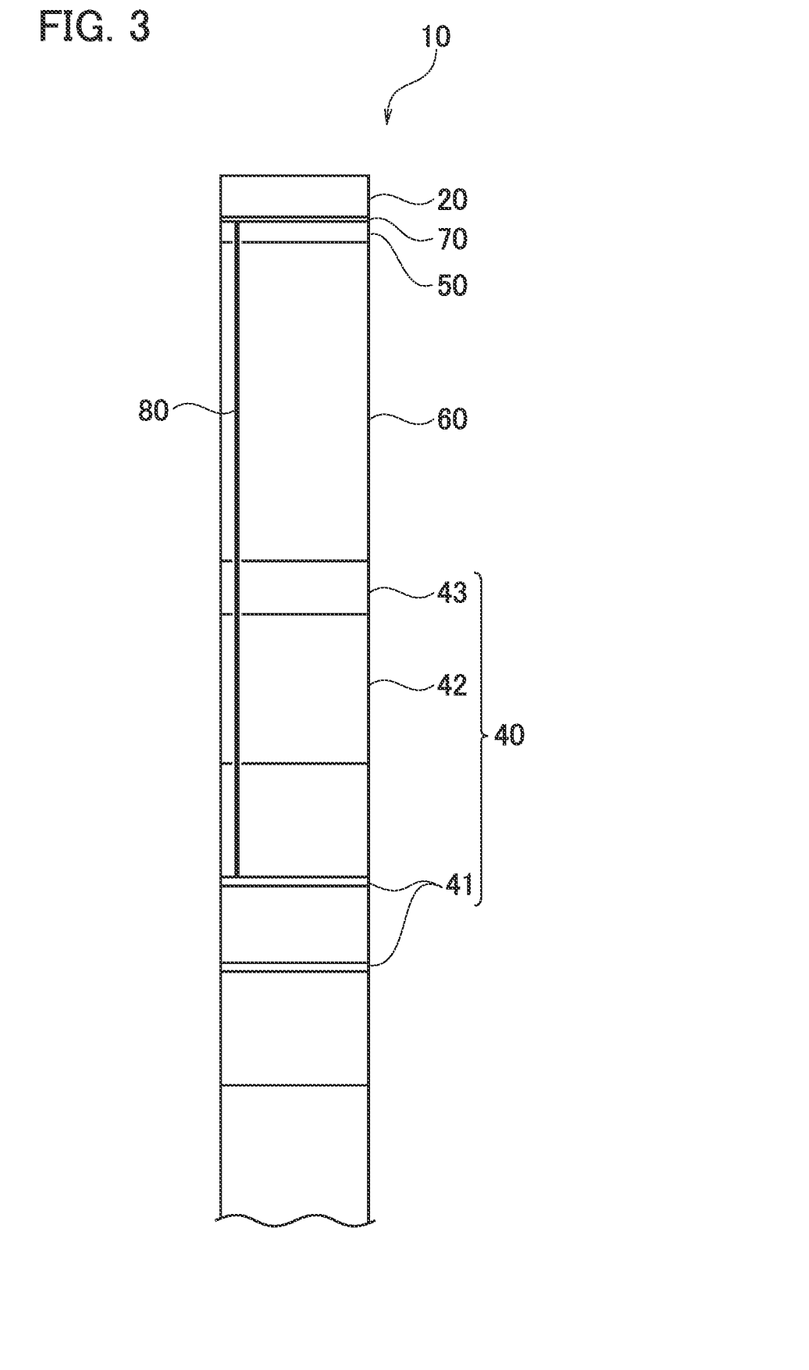
FIG. 3 is a partial cross-sectional view of the non-pneumatic tire 10 along the F3-F3 direction of FIG. 2.

Next, the configuration of the non-pneumatic tire 10 mounted on the wheeled mobile 100 will be described. FIG. 2 is an overall side view of the non-pneumatic tire 10. FIG. 3 is a partial cross-sectional view of the non-pneumatic tire 10 along the F3-F3 direction of FIG. 2.

As shown in FIGS. 2 and 3, the non-pneumatic tire 10 includes a tread portion 20 and a wheel portion 30.

The tread portion 20 is a portion in contact with the road 200 (see FIG. 1) and is formed of a rubber material. On the surface of the tread portion 20 in contact with the road 200, a tread pattern may be formed according to the application of the wheeled mobile 100.

The wheel portion 30 is composed of an inner annular body 40, an outer annular body 50 and a connecting member 60. The tread portion 20 is provided on the outside in the radial direction of the wheel portion 30.

The inner annular body 40 has a rotation axis portion 41, spokes 42 and an annular portion 43. The inner annular body 40 is an annular body (also referred to as an inner cylinder) centered on the rotation axis portion 41.

The rotation axis portion 41 is formed by an insertion hole through which the axle 120 of the wheeled mobile 100 is inserted, and the inner annular body 40 rotates around the rotation axis portion 41 (axle 120). The rotation axis portion 41 and the annular portion 43 are connected by a plurality of spokes 42 radially extending from the rotation axis portion 41.

The outer annular body 50 is provided radially outward of the inner annular body 40. Specifically, the outer annular body 50 is also an annular body (also referred to as an outer cylinder) having the rotation axis portion 41 as its center, and rotates around the rotation axis portion 41 (axle 120).

The diameter size of the outer annular body 50 is larger than the diameter size of the inner annular body 40. That is, the outer annular body 50 is located radially outward from the inner annular body 40 at a predetermined distance.

The connecting member 60 connects the inner annular body 40 and the outer annular body 50. A plurality of connecting members 60 are provided in the circumferential direction of the inner annular body 40 and the outer annular body 50. The connecting member 60 elastically deforms over a predetermined range (for example, about several centimeters.) when a load is applied.

The wheel portion 30 is mainly formed of a resin material. However, a part of the wheel portion 30, specifically the rotation axis portion 41, is formed of a conductor, specifically a metal material. Portions requiring higher strength, such as the spokes 42, may also be formed of a metallic material. That is, at least a part of the wheel portion 30 is formed of a non-metallic material such as a resin material.

An electrode portion 70 is provided radially inside the tread portion 20. In this embodiment, the electrode portion 70 is in contact with the tread portion 20 and is provided radially inward of the tread portion 20. That is, the tread portion 20 is adjacent to the outer annular body 50 through the electrode portion 70, and is provided on the radially outer side of the outer annular body 50. The electrode portion 70 is in contact with the outer annular body 50 and is provided on the radially outer side of the outer annular body 50.

The electrode portion 70 is formed of a conductor having a predetermined width in the tire width direction and a predetermined length in the tire circumferential direction. In this embodiment, the electrode portion 70 is formed of a tape-like metal material (for example, aluminum tape).

In this embodiment, the electrode portion 70 is provided to cover the entire width of the outer annular body 50 in tire width direction. In other words, the electrode portion 70 is provided to cover the entire width of the tread portion 20 in the tire width direction.

A wiring portion 80 connects the electrode portion 70 and the inner annular body 40. The wiring portion 80 is formed of a conductor such as a metal material. The wiring portion 80 is preferably formed by coating a core wire formed of a conductor with an insulating material such as vinyl.

The wiring portion 80 connects the electrode portion 70 formed of a conductor and the conductor portion of the inner annular body 40. In this embodiment, the wiring portion 80 connects the electrode portion 70 and the rotation axis portion 41. In FIG. 3, the wiring route of the wiring portion 80 is shown schematically in a straight line, but the wiring portion 80 is preferably crawled along the surface shape of the wheel portion 30.

The wiring portion 80 may be connected to the electrode portion 70 through a through hole (not shown) formed in the wheel portion 30 (inner annular body 40 and outer annular body 50), or may be crawled along the surface of the wheel portion 30 and connected to the electrode portion 70. When the rotation axis portion 41 and the spokes 42 are formed of a conductor (metal material) and the rotation axis portion 41 and the spokes 42 are in a conductive state, the wiring portion 80 may connect the electrode portion 70 and the spokes 42.

(3) Shape and Arrangement of Electrode Portion and Wiring Portion

Figure 4:
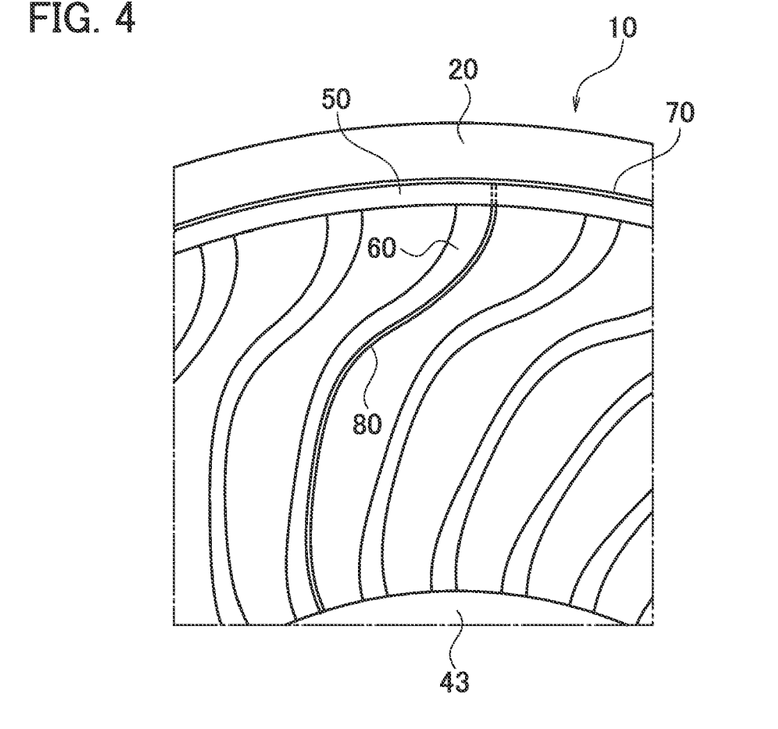
FIG. 4 is a partially enlarged side view of the non-pneumatic tire 10.

Next, the shape and arrangement of the electrode portion 70 and the wiring portion 80 will be further described. FIG. 4 is a partially enlarged side view of the non-pneumatic tire 10. Specifically, FIG. 4 is a partially enlarged side view of the non-pneumatic tire 10 including the annular portion 43 of inner annular body 40, the outer annular body 50, and the connecting member 60.

As shown in FIG. 4, the electrode portion 70 is an annular shape extending along the tire circumferential direction. That is, in this embodiment, the electrode portion 70 is provided along the outer circumferential surface of the outer annular body 50 (inner circumferential surface of the tread portion 20) over the entire circumferential direction. However, as described above, the electrode portion 70 may not necessarily be provided in the entire circumferential direction, and may have a predetermined length in tire circumferential direction so as not to greatly reduce the transmission efficiency of the electric power supplied from the side of the road 200.

The wiring portion 80 is crawled along the surface of the connecting member 60. The wiring portion 80 is preferably fixed to the surface of the connecting member 60 by a method such as adhesion in order to prevent the wiring portion from floating.

Further, in order to prevent a user of the wheeled mobile 100 (electric wheelchair) or the like from easily touching the wiring portion, it is preferable that the wiring portion 80 is crawled along the front surface or the back surface of the connecting member 60 orthogonal to tire circumferential direction, not along the side surface of the connecting member 60.

Further, from the same viewpoint, it is preferable that the wiring portion 80 is positioned on the side (inside) of the wheeled mobile 100 in a state where the non-pneumatic tire 10 is mounted on the wheeled mobile 100 (see FIG. 1). When the direction of rotation of the non-pneumatic tire 10 is specified, the non-pneumatic tire 10 for the right wheel and the non-pneumatic tire 10 for the left wheel are separately prepared. On the other hand, if the direction of rotation of the non-pneumatic tire 10 is not specified, the non-pneumatic tire 10 may be attached to the wheeled mobile 100 such that the wiring portion 80 is positioned on the wheeled mobile 100 side (inside).

(4) Function and Effects

According to the above-described embodiment, the following effects can be obtained. Specifically, the non-pneumatic tire 10 includes the electrode portion 70 which is in contact with the tread portion 20 and is provided on the radially inner side of the tread portion 20, and the wiring portion 80 which connects the electrode portion 70 and the inner annular body 40 and is formed of a conductor.

The electrode portion 70 is formed of a conductor having a predetermined width in the tire width direction and a predetermined length in the tire circumferential direction.

Accordingly, the electrode portion 70 provided radially inside the tread portion 20 and the inner annular body 40 in the vicinity of the axle 120 of the wheeled mobile 100 can be made conductive. Thus, the transmission efficiency of the electric power supplied from the road 200 side can be improved even when the main component of the non-pneumatic tire 10, specifically, at least a part of the wheel portion 30 is formed of a non-metallic material.

Although the power transmission unit 210 and the electrode portion 70 are not always in conduction, the distance between the power transmission unit 210 and the electrode portion 70 is short, so that the power transmission efficiency is not greatly affected. Similarly, tire radial direction inner end of the wiring portion 80 may not necessarily be connected to the rotation axis portion 41, but may be connected to the spokes 42 or the annular portion 43 of the inner annular body 40.

Further, since the non-pneumatic tire 10 has a smaller deformation, particularly in the tensile direction, between the tread portion 20 and the axle 120 as compared with the standard pneumatic tire, the wiring portion 80 may be a standard wiring that does not take into consideration the extensibility or the like. Thus, the transmission efficiency of the power supplied from the side of the road 200 can be effectively improved by the extremely simple wiring.

Furthermore, according to the non-pneumatic tire 10, it has been confirmed that the transmission efficiency of electric power (power supplying efficiency) is significantly improved compared with that of the standard pneumatic tire.

In the present embodiment, the electrode portion 70 is an annular shape extending along the tire circumferential direction. Accordingly, even if the non-pneumatic tire 10 rolls on the road 200, any portion of the electrode portion 70 is brought into a state of being close to the power transmission unit 210. Thus, the transmission efficiency of the power supplied from the side of the road 200 can be further improved.

In this embodiment, the power transmission unit 210 is wider than tire width, and the electrode portion 70 is provided to cover the entire width of the outer annular body 50 in the tire width direction. Therefore, the size of the electrode portion 70 in the tire width direction can be maximized. Thus, the transmission efficiency of the power supplied from the side of the road 200 can be further improved.

(5) Other Embodiments

Although the contents of the present invention have been described above in accordance with the embodiments, the present invention is not limited to these descriptions, and it is obvious to those skilled in the art that various modifications and improvements can be made.

For example, the configuration of the non-pneumatic tire 10 described above may be modified to modified examples 1 to 5 described below. Hereinafter, portions different from the above-described non-pneumatic tire 10 will be mainly described, and the same portions will be omitted as appropriate.

(5.1) Modified Example 1

Figure 5:
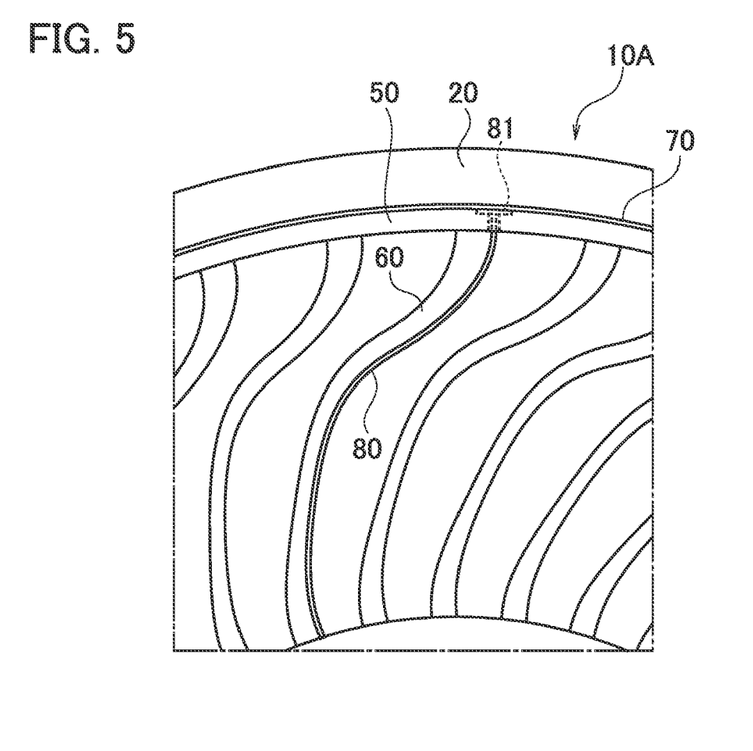
FIG. 5 is a partially enlarged side view of a non-pneumatic tire 10 A of a modified example 1.

FIG. 5 is a partially enlarged side view of a non-pneumatic tire 10 A of a modified example 1. As shown in FIG. 5, the non-pneumatic tire 10 A is provided with a plate portion 81 between the outer annular body 50 and the electrode portion 70.

The plate portion 81 is formed of a plate-like conductor and is connected to the wiring portion 80. The plate portion 81 can facilitate connection with the wiring portion 80 while securing a conductive area with the electrode portion 70. Thus, the transmission efficiency of the power supplied from the side of the road 200 can be further improved.

When the plate portion 81 is provided only in the central portion of the tire width direction, the wiring portion 80 may be connected to the plate portion 81 through a through hole (not shown) formed in the outer annular body 50.

(5.2) Modified Example 2

Figure 6:
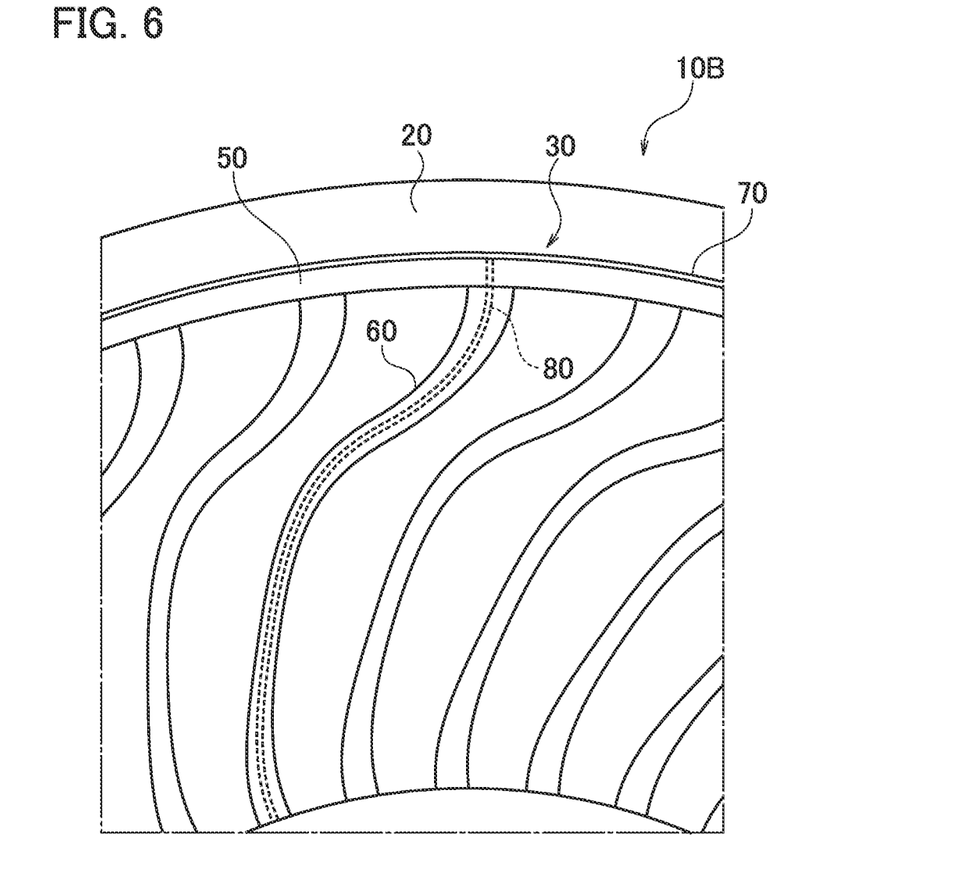
FIG. 6 is a partially enlarged side view of a non-pneumatic tire 10 B of a modified example 2.

FIG. 6 is a partially enlarged side view of a non-pneumatic tire 10 B of a modified example 2. As shown in FIG. 6, in the non-pneumatic tire 10 B, the wiring portion 80 is embedded in the wheel portion 30.

Specifically, the wiring portion 80 is embedded in the outer annular body 50 and the connecting member 60. Accordingly, the wiring portion 80 is not exposed to the surface of the wheel portion 30. Thus, damage to the wiring portion 80 can be prevented.

The wiring portion 80 can be embedded in the wheel portion 30 by being disposed at a predetermined position in the mold in advance when the wheel portion 30 is molded.

(5.3) Modified Example 3

Figure 7:
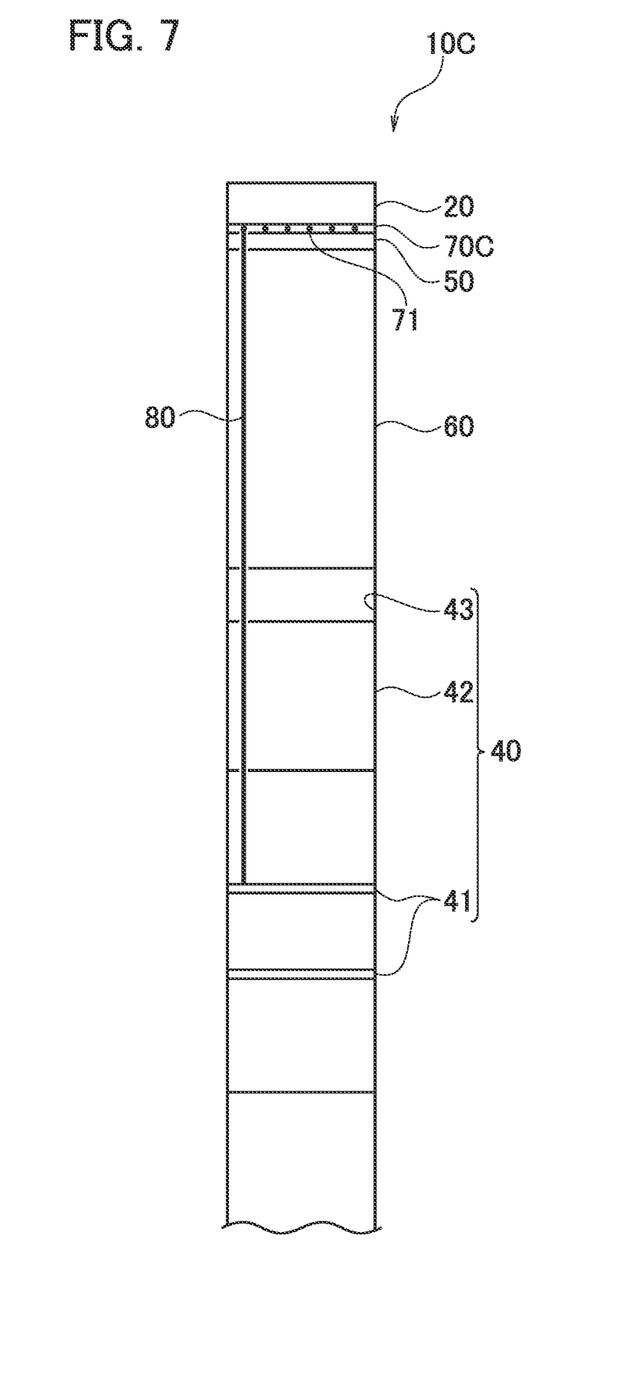
FIG. 7 is a partial cross-sectional view of a non-pneumatic tire 10 C of a modified example 3.

FIG. 7 is a partial sectional view of a non-pneumatic tire 10 C of a modified example 3. Specifically, FIG. 7 is a partial cross-sectional view of a non-pneumatic tire 10 C along the tire width direction and the tire radial direction.

As shown in FIG. 7, the non-pneumatic tire 10 C includes a spiral belt 70 C. A cord 71 formed of a metal material is arranged along the tire circumferential direction in the spiral belt 70 C.

Specifically, the cord 71 is wound around the tire circumferential direction. In the case of the non-pneumatic tire 10 C, it is wound about 6 times along the tire circumferential direction. The number of turns of the cord 71 may vary depending on the performance required for the non-pneumatic tire 10 C.

That is, in the non-pneumatic tire 10 C, the electrode portion is also used by the cord 71 included in the spiral belt 70 C. Therefore, the wiring portion 80 is connected to the cord 71.

According to the non-pneumatic tire 10 C, there is no need to newly provide an electrode portion, and the transmission efficiency of power supplied from the side of the road 200 can be improved while suppressing an increase in manufacturing cost and weight.

(5.4) Modified Example 4

Figure 8:
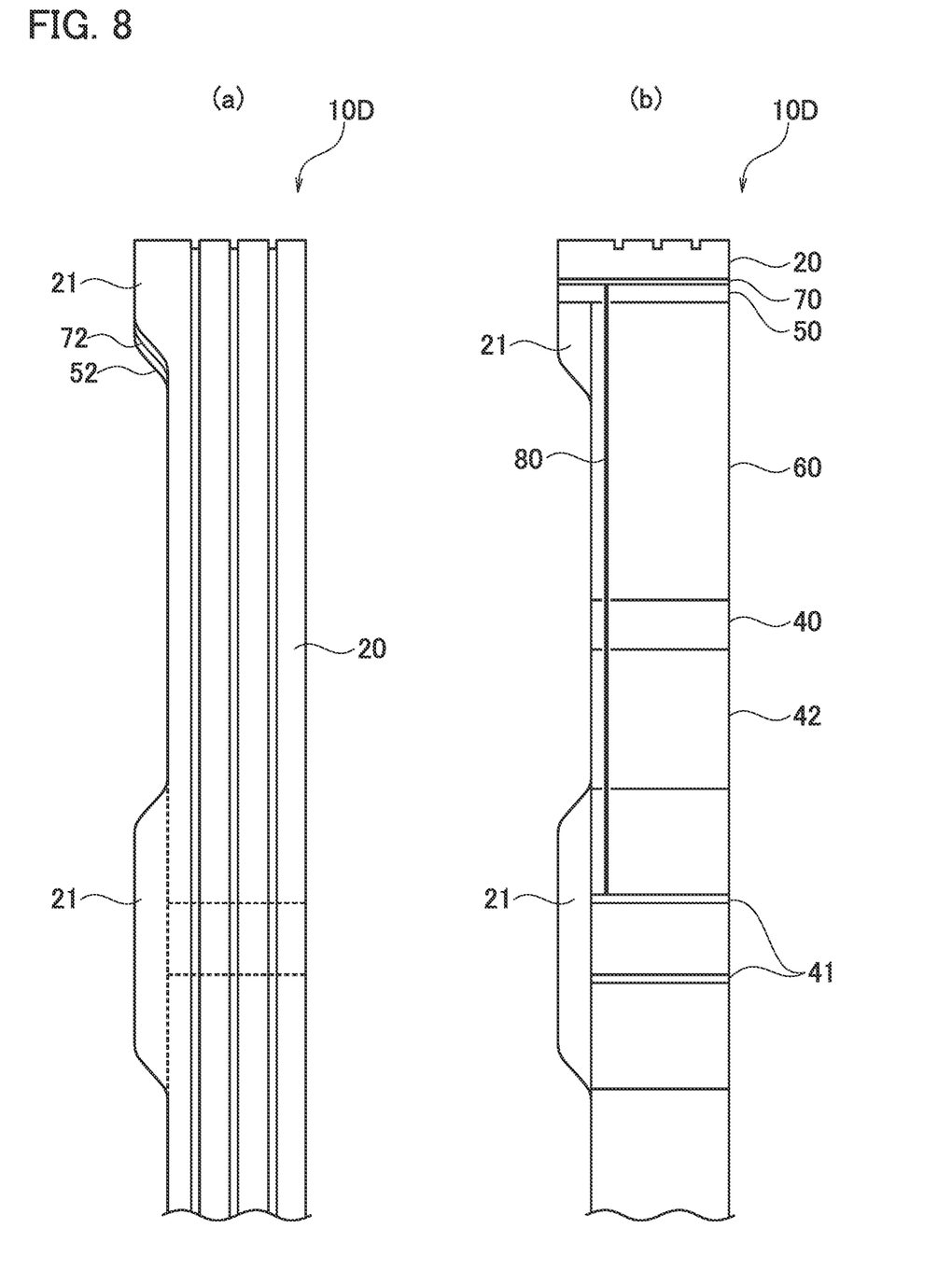

FIGS. 8 A and 8 B are partial front views and partial sectional views of a non-pneumatic tire 10 D of a modified example 4.

Specifically, FIG. 8 A shows a partial front view of the non-pneumatic tire 10 D along the tire width direction and the tire radial direction, and FIG. 8 B shows a partial sectional view of the non-pneumatic tire 10 D along the tire width direction and the tire radial direction.

As shown in FIGS. 8 A and 8 B, the non-pneumatic tire 10 D of the tread portion 20 is provided with a wide portion 21. In the non-pneumatic tire 10 D, a plurality of wide portions 21 are provided in the tire circumferential direction. In the non-pneumatic tire 10 D, tire four wide portions 21 is provided at 90 degree intervals in the tire circumferential direction.

It should be noted that the number of the wide portions 21 is not particularly limited, but it is preferable to provide several to about 5 to 6 wide portions at appropriate intervals in the tire circumferential direction.

The wide portion 21 is preferably positioned on the side (inner side) of the wheeled mobile 100 in a state that the non-pneumatic tire 10 D is mounted on the wheeled mobile.

The outer annular body 50 also has a wide portion 52 and the electrode portion 70 also has a wide portion 72 so as to correspond to the wide portion 21. That is, in the non-pneumatic tire 10 D, a portion of the tread portion 20 and the electrode portion 70 in the tire circumferential direction have the wider portion 21 and the wider portion 72, respectively, which are wider than the other portions in the tire width direction.

According to the non-pneumatic tire 10 D, since the area of the electrode portion 70 can be increased, the transmission efficiency of the electric power supplied from the side of the road 200 can be improved.

(5.5) Modified Example 5

Figure 9:
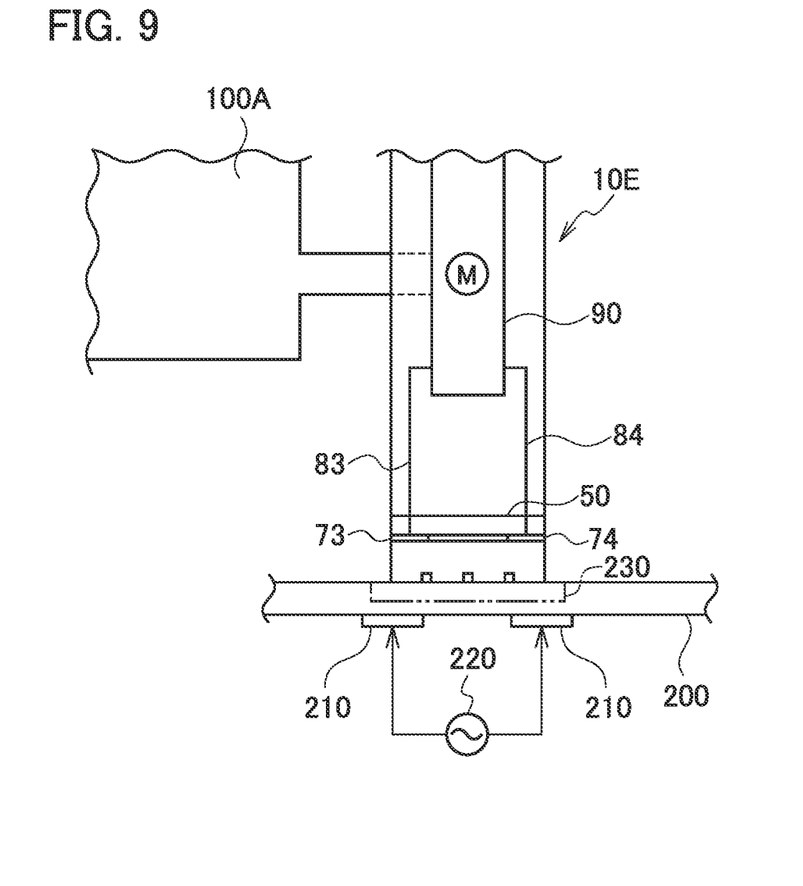
FIG. 9 is a schematic cross-sectional view of a non-pneumatic tire 10 E of a modified example 5 and a wheeled mobile 100 A mounted with the non-pneumatic tire 10 E.

FIG. 9 is a schematic cross-sectional view of a non-pneumatic tire 10 E of a modified example 5 and the wheeled mobile 100 A mounted with the non-pneumatic tire 10 E. Specifically, FIG. 9 shows a schematic cross-sectional view of the wheeled mobile 100 A (including the non-pneumatic tire 10 E) along the width direction and a schematic cross-sectional view of the road 200 along the width direction.

As shown in FIG. 9, in the present modified example, a pair of the power transmission units 210 are provided so as to face single non-pneumatic tire 10 E.

In this modified example, an in-wheel motor 90 is provided inside the non-pneumatic tire 10 E. That is, the wheeled mobile 100 A is not provided with a motor for driving a wheel (tire). The in-wheel motor 90 may include a battery (not shown) that stores power supplied from the power transmission unit 210.

In the non-pneumatic tire 10 E, two electrode portions 73 and an electrode portion 74 separated in the tire width direction are provided so as to correspond to a pair of power transmission units 210.

A wiring portion 83 is connected to the electrode portion 73, and a wiring portion 84 is connected to the electrode portion 74. The wiring portion 83 and the wiring portion 84 are connected to the in-wheel motor 90. Thus, power can be supplied from the power transmission unit 210 to the in-wheel motor 90 via the electrode portion 73 and the wiring portion 83, and the electrode portion 74 and the wiring portion 84.

However, the non-pneumatic tire 10 E may not necessarily be provided with the in-wheel motor 90, and the moving motor may be provided on the side of the wheeled mobile 100 A. In this case, the wiring portion 83 and the wiring portion 84 are wired to the side of the wheeled mobile 100 A.

Further, since the non-pneumatic tire 10 E is positioned so that the electrode portion 73 and the electrode portion 74 face the pair of power transmission units 210, a guide groove portion 230 for guiding the non-pneumatic tire 10 E may be formed on the road 200.

Although modified examples 1 to 5 of the non-pneumatic tire 10 has been described above, the non-pneumatic tire 10 may be further modified as follows.

For example, the electrode portion 70 may be provided inside the tread portion 20. That is, the electrode portion 70 may be embedded in the rubber forming tread portion 20. When the tread portion 20 is worn, only the tread portion 20 or the electrode portion 70 and the tread portion 20 may be replaced.

Further, when the thickness of the tread portion 20 decreases due to wear, the distance between the electrode portion 70 and the power transmission unit 210 approaches, and the power transmission efficiency (power supply efficiency) increases. Therefore, the wear state of the tread portion 20 may be determined based on the increase in the transmission efficiency.

In the above-described embodiment, the wheeled mobile 100 is an electric wheelchair, but as long as a pair of left and right non-pneumatic tire 10 are mounted, the wheeled mobile 100 may be a normal vehicle such as a four-wheel vehicle, for example, other than an electric wheelchair.

As noted above, embodiments of the invention have been described, but it should not be understood that the statements and drawings that form part of this disclosure limit the invention. Various alternative embodiments, embodiments and operational techniques will become apparent to those skilled in the art from this disclosure.

REFERENCE SIGNS LIST

1 Power supply system
10, 10 A, 10 B, 10 C, 10 D, 10 E Non-pneumatic tire
20 Tread portion
21 Wide portion
30 Wheel portion
40 Inner annular body
41 Rotation axis portion
42 Spoke
43 Annular portion
50 Outer annular body
52 Wide portion
60 Connecting member
70 Electrode section
70 C Spiral belt
71 cord
72 Wide portion
73, 74 Electrode portions
80 Wiring portion
81 Plate portion
83, 84 Wiring portions
90 In-wheel motor
100, 100 A Wheeled mobile
110 Nut
120 Axle
130 Rectifying circuit
140 Battery
200 Road
210 Power transmission unit
220 Power supply device
230 Guide groove portion

The invention claimed is:

1. A non-pneumatic tire comprising:
  a wheel portion including an inner annular body centered on a rotation axis portion, an outer annular body radially outward of the inner annular body, and a connecting member configured to elastically deform and connecting the inner annular body and the outer annular body;
  a tread portion provided radially outward of the outer annular body and configured to be in contact with a road;
  an electrode portion inside the tread portion, or in contact with and radially inside the tread portion; and
  a wiring portion for connecting the electrode portion and the inner annular body and formed of a conductor, wherein
  the electrode portion is annular extending along the tire circumferential direction,
  at least a part of the wheel portion is formed of a non-metallic material, and
  the electrode portion is formed of a conductor having a predetermined width in tire width direction, and having a predetermined length in tire circumferential direction.

2. The non-pneumatic tire according to claim 1, wherein the electrode portion covers the entire width of the outer annular body in the tire width direction.

3. The non-pneumatic tire according to claim 2, wherein the wiring portion is embedded in the wheel portion.

4. The non-pneumatic tire according to claim 2, wherein a part of the tread portion and the electrode portion in the tire circumferential direction has a wider portion in the tire width direction than other portions.

5. The non-pneumatic tire according to claim 1, wherein the electrode portion is a cord formed of a metal material and included in a spiral belt arranged along the tire circumferential direction, and
  the wiring portion is connected to the cord.

6. The non-pneumatic tire according to claim 5, wherein the wiring portion is embedded in the wheel portion.

7. The non-pneumatic tire according to claim 5, wherein a part of the tread portion and the electrode portion in the tire circumferential direction has a wider portion in the tire width direction than other portions.

8. The non-pneumatic tire according to claim 1, wherein the wiring portion is embedded in the wheel portion.

9. The non-pneumatic tire according to claim 8, wherein a part of the tread portion and the electrode portion in the tire circumferential direction has a wider portion in the tire width direction than other portions.

10. The non-pneumatic tire according to claim 1, wherein a part of the tread portion and the electrode portion in the tire circumferential direction has a wider portion in the tire width direction than other portions.

11. A non-pneumatic tire comprising:
  a wheel portion including an inner annular body centered on a rotation axis portion, an outer annular body radially outward of the inner annular body, and a connecting member configured to elastically deform and connecting the inner annular body and the outer annular body;
  a tread portion provided radially outward of the outer annular body and configured to be in contact with a road;
  an electrode portion inside the tread portion, or in contact with and radially inside the tread portion; and
  a wiring portion for connecting the electrode portion and the inner annular body and formed of a conductor, wherein at least a part of the wheel portion is formed of a non-metallic material, and the electrode portion is formed of a conductor having a predetermined width in tire width direction, and having a predetermined length in tire circumferential direction, wherein a part of the tread portion and the electrode portion in the tire circumferential direction has a wider portion in the tire width direction than other portions.

\* \* \* \* \*